A. E. SMITH.
AUTOMATIC TRAIN STOP AND SPEED CONTROL DEVICE.
APPLICATION FILED APR. 2, 1919.

1,356,318.  Patented Oct. 19, 1920.

Inventor:
Arthur E. Smith

UNITED STATES PATENT OFFICE.

ARTHUR EUGENE SMITH, OF HARTFORD, NEW YORK.

AUTOMATIC TRAIN-STOP AND SPEED-CONTROL DEVICE.

1,356,318. Specification of Letters Patent. Patented Oct. 19, 1920.

Application filed April 2, 1919. Serial No. 287,089.

*To all whom it may concern:*

Be it known that I, ARTHUR EUGENE SMITH, a citizen of the United States, residing in the town of Hartford, county of Washington, and State of New York, have invented an Automatic Train-Stop and Speed-Control Device, of which the following are specifications.

My invention relates to improvements in automatic train-stops and speed-control devices, and is applicable to steam and electric railroads where air-brake systems are in use; furthermore, it acts as a safety device guarding against the negligence of engineers and other railway employes; and provides simple and inexpensive devices, (or units) forming a system which can be used in connection with any class of signals—such as semaphore, interlocking, disk, etc., and all other automatic devices designed for such purpose.

This invention has for its object the production of a system that by the aid of electric power derived from a storage battery, or otherwise, will operate a valve inserted in the train-pipe, and a valve inserted in the steam-pipe of a steam locomotive; and govern a switch the workings of which will control an electric locomotive to the end that both may be either controlled or stopped automatically. The further object is to provide a device that will control the electric circuit installed upon the engine by means of a reversible switch operated by a trip lever.

Similar letters refer to similar parts throughout the specifications, etc.

Figure 1:
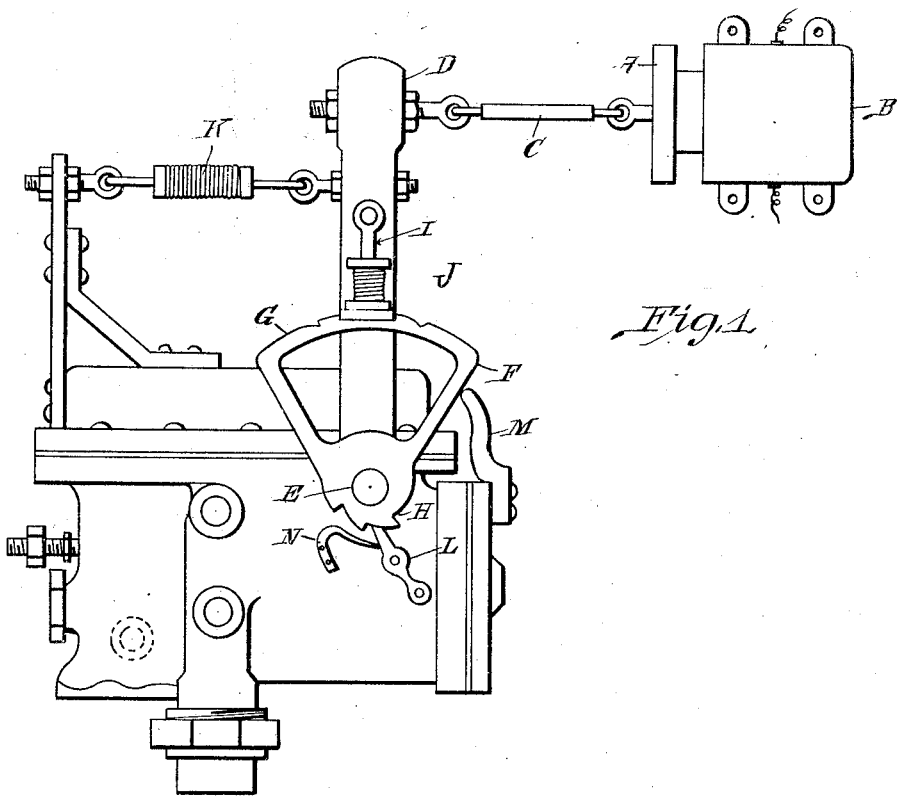
Figure 1 is a modified form of an engineer's valve, and, also, the electro-magnet operating the ratchet mechanism, which, in turn, operates the brake valve.

I obtain the objects of my invention by the mechanisms illustrated in the accompanying drawing next heretofore referred to.

The action of the ratchet mechanism operating the modified form of the New York engineer's brake valve is as follows: The special arc ratchet-wheel F is fitted with a notch segment G, also the notch-segment H. This ratchet-wheel is keyed to the valve shaft E. The vibrating lever D is fitted with the pawl I fitted with a lifting ring. This pawl is firmly held against the notched segment G by means of the spring J. As the arm is drawn back left-handed by means of the contraction of the heavy coil-spring K the click slides over the point of the next tooth to be moved right-handed a certain distance by means of the connecting-rod C, and the armature A of the electro-magnet B when electricity is passed through its coils; and vice-versa if a closed circuit be used.

As soon as the supply of electricity is cut off from the electro-magnet the force attracting the armature A is, likewise, cut off, thereby releasing the armature A, which, with the connecting-rod C, and vibrating lever D, are again moved to their former positions by means of the contraction of the spring K, thus turning the ratchet-wheel F, likewise, the valve-shaft E, the distance of one notch. The turning of the valve-shaft E, and the ratchet-wheel F, the distance of one notch gives the valve one of its positions.

The notch segment H acts in unison with the notch-segment G, and thereupon the pawl L held in position by means of the V-spring N firmly against the segment, H, slides over the point catching the notch of the segment thereby holding the ratchet-wheel F from turning toward the left. The large V-spring M has a tendency to hold the ratchet-wheel F tightly against the pawl L. The above action is repeated whenever the solenoid governing this mechanism is acted upon by electricity.

Whenever the engine-man lifts pawls I and L, respectively, from their positions, the V-spring M exerts its pressure upon the ratchet-wheel F keyed to the valve shaft E throwing it left-handed, thereby resetting the valve.

Perhaps it might be good practice to have the segments G and H to contain three notches. Allowing each notch of the segments G and H to represent a movement of the valve stem E, the valve stem E could be moved to three positions, which, in turn, would allow the valve to give different pressures of air to the train-pipe of the air-brakes. The first notch might be styled the service notch as it would not move the valve; the second notch might be called the slow-down notch as it would decrease the speed of the locomotive; the third notch might be called the emergency notch as it would give the valve its emergency position stopping the locomotive.

If a closed circuit, instead of an open circuit, be used in this device, the positions and connections of the armature A, and solenoid, B, and the spring K should be reversed. By reversal of positions the armature A of the solenoid B would hold the vibrating lever D to the left as long as a current of electricity flowed through its coils. By breaking this circuit the armature A would be released, and the contraction of the spring K would draw the arm to the right thus moving the valve one notch. By restoring the current of electricity to the solenoid the arm would again be drawn to the left and there held expanding the coil spring K as long as the solenoid remained under the influence of the current. By giving proper lengths to the notches of the segments the engineer's brake valve may be operated as desired.

Figure 2:
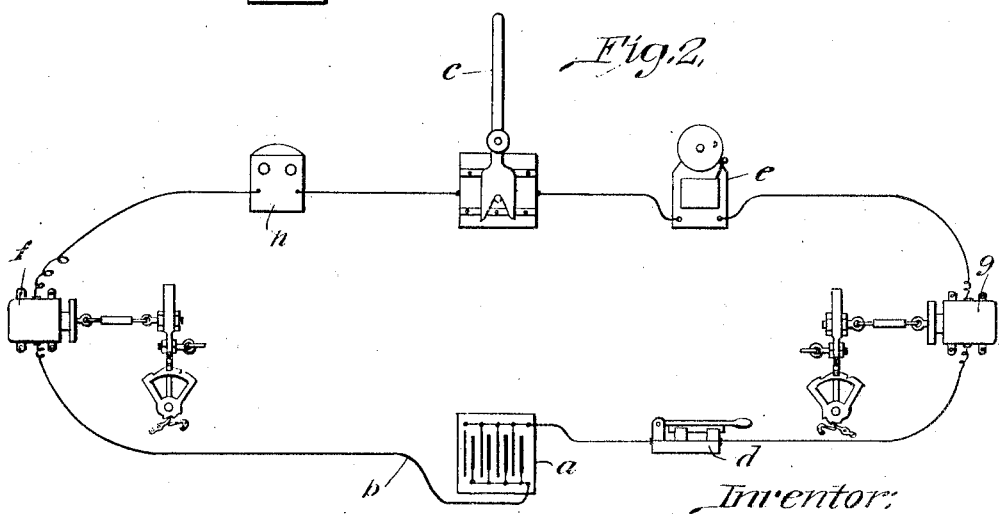
Fig. 2 is a diagram showing the valve devices, also various other units operated by power from the electric circuit installed in the cab of the locomotive.

Fig. 2 is a diagram of the primary circuit which we will consider as being a closed circuit. The small letter, (a) represents the insulated wire of this circuit; the letter, (b) the storage battery, third rail, trolley wire, or other source of electrical supply; the letter, (c) the reversible switch which, in its central position, closes this circuit, but when moved in either direction from its central position breaks it closing the secondary circuit if one be used with a solenoid in place of the coil spring K and its connections; the letter, (d) the jack-knife switch by means of which the engineman may render the automatic train-stop and speed-control devices inoperative; the letter, (e) the electric gong which, when sounded, will be as a warning to the engineman; the letter, (f) the solenoid operating the ratchet mechanism controlling the engineer's brake valve; the letter, (g) the solenoid operating the ratchet mechanism controlling the cut-off valve inserted in the steam pipe conveying steam to the cylinders if a steam locomotive, or the ratchet mechanism controlling the switches inserted in the circuit conveying electricity to the motors if an electric locomotive; the letter, (h) is the automatic recording and speed-governing device by means of which the workings of the automatic train-stop is recorded, and the speed of the locomotive is reduced when it exceeds the predetermined rate of speed—this device being made the subject matter for an application for Letters-Patent.

I claim as my invention:

In a train controlling system, an engineer's brake valve, a ratchet rigidly mounted on the stem of the said valve, a spring normally holding said ratchet in inoperative position, an arm pivoted on said valve stem, a spring-pressed holding pawl carried by said arm adapted to engage the said ratchet, a spring-pressed holding pawl normally engaging said ratchet and adapted to be manually disengaged therefrom; a link connecting the armature of said solenoid to said arm, a spring normally holding said arm in inoperative position, and a circuit through said solenoid including a reversible switch adapted to be operated by a track-obstacle.

Dated at Hartford, Washington County, New York, this 18th. day of March, 1919.

ARTHUR EUGENE SMITH.

Witnesses:
 WILLIAM W. NORTON,
 JULIA I. H. NORTON.